United States Patent [19]
Saito et al.

[11] Patent Number: 5,203,023
[45] Date of Patent: Apr. 13, 1993

[54] PHASE LIKELIHOOD COMPARISON DIVERSITY RECEIVER

[75] Inventors: Shigeki Saito, Yokohama; Yasushi Yamao, Yokosuka, both of Japan

[73] Assignee: Nippon Telegraph and Telephone Corporation, Tokyo, Japan

[21] Appl. No.: 613,704

[22] PCT Filed: Mar. 26, 1990

[86] PCT No.: PCT/JP90/00393
§ 371 Date: Jan. 11, 1991
§ 102(e) Date: Jan. 11, 1991

[87] PCT Pub. No.: WO90/11656
PCT Pub. Date: Oct. 4, 1990

[30] Foreign Application Priority Data

Mar. 28, 1989 [JP] Japan ................... 1-75918
Aug. 4, 1989 [JP] Japan ................. 1-202489
Aug. 14, 1989 [JP] Japan ................. 1-210461

[51] Int. Cl.⁵ ............................................. H04B 7/08
[52] U.S. Cl. ................................. 455/133; 375/100; 455/134; 455/137; 455/273; 455/277.1
[58] Field of Search ............................. 455/132–140, 455/273, 276–278, 276.1, 277.1, 277.2, 278.1; 375/100, 40

[56] References Cited

U.S. PATENT DOCUMENTS 4,864,641  9/1989  Nakamura .......................... 455/276
4,868,890  9/1989  Lennartsson ....................... 455/139

FOREIGN PATENT DOCUMENTS 58-150338  9/1983  Japan .
0117522  5/1988  Japan ................................ 455/273

OTHER PUBLICATIONS

D. O. Reudink, et al., "Diversity Techniques", Microwave Mobile Communications, Chapter 6, Apr. 1974.
J. Chuang, et al., "A High Performance Diversity Selection Technique for TDMA Portable Radio Communications", IEEE Communications Society, Nov. 1989.

Primary Examiner—Reinhard J. Eisenzopf
Assistant Examiner—Chi H. Pham
Attorney, Agent, or Firm—Cushman, Darby & Cushman

[57] ABSTRACT

In the diversity receiver which switches between receiver branches to receive phase modulated signals, this invention can achieve a diversity effect with a circuit of simple construction which by switching between receiver branches based on relative modulation phase error, and can attain diversity effect not only against fading but also against any factor which might affect the transmission lines.

8 Claims, 20 Drawing Sheets prior art (post-detection diversity)

prior art (antenna select diversity)

$S_1\ S_2\ S_3$
$4 = (1\ 0\ 0)$
$2 = (0\ 1\ 0)$
$1 = (0\ 0\ 1)$

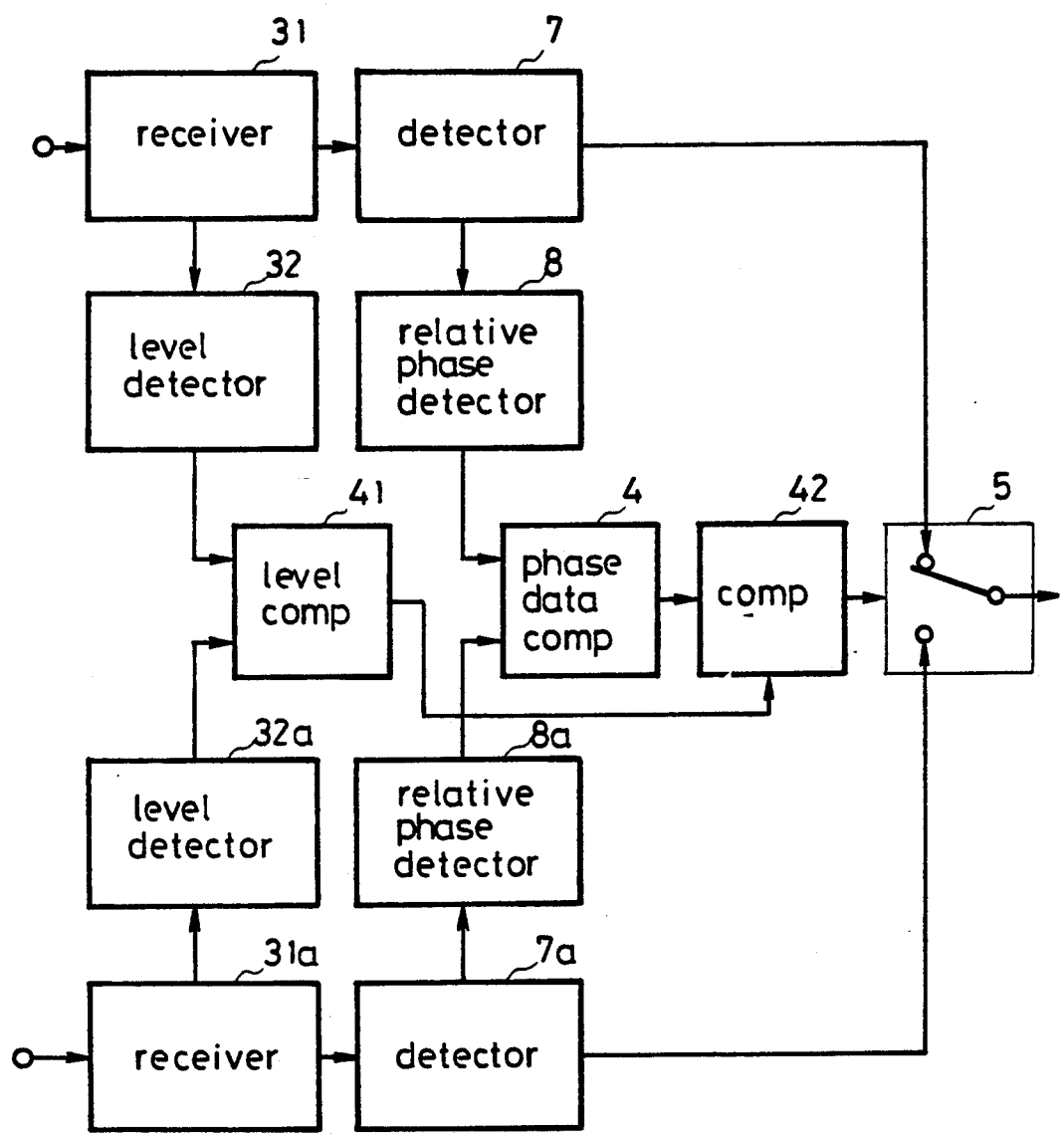
F I G. 22

_5,203,023_

PHASE LIKELIHOOD COMPARISON DIVERSITY RECEIVER

TECHNICAL FIELD

This invention relates to a diversity receiver in radio transmission, and more specifically, to a diversity receiver which can improve transmission characteristics of a circuit which transmits digital signals by phase modulated signals.

BACKGROUND TECHNOLOGY

As radio waves are used as the transmission medium in radio communications, level deviation or phase deviation of received signals takes place due to fading or interference to deteriorate transmission characteristics. Diversity reception has been known as an effective method to prevent such deterioration in transmission characteristics. The most typical diversity reception is postdetection diversity receiver which instantaneously selects a fading signal having the highest received signal level out of plural fading signals each of which changes independently. The reception system is based on the assumption that the higher the level of received signals, the higher is the S/N ratio (signal/noise ratio) and the smaller is phase deviation, and thus the transmission quality is expected to improve.

FIG. 1 shows a prior art typical 2-branch postdetection diversity receiver wherein two antennas 101, 102 are installed with a suitable interval distance between them in order to obtain fading waves independently, and are respectively connected to receivers 103, 104. As the detector of the received signal levels, IF log-amplifiers 105, 106 are used for intermediate frequency. The IF log-amplifiers 105, 106 are equipped with a means to output DC voltage proportionate to decibel of the received signal level. By comparing the output voltages from the two log amplifiers 105, 106 by a level comparator 107, the received signal levels can be compared. With the comparator output, output from one of the detectors 108 or 109 with the higher received signal level is selected by a diversity select switch 110. This allows an output terminal 111 to constantly receive detector outputs with a higher S/N ratio and smaller phase deviation.

However, the system requires plural receivers, and the size of the whole system inevitably becomes large. There has been proposed an antenna select diversity reception system as a simpler structure wherein plural antennas are switched to receive signals by only one receiver.

FIG. 2 shows a prior art typical 2-branch antenna select diversity reception circuit wherein two antennas 121 and 122 are placed at a suitable interval distance therebetween so as to obtain fading waves independently (not correlated) from each other. Either one of the antennas 121, 122 is connected to a receiver 124 with an antenna selector 123. The switching is conducted with the comparator data from a level comparator 126. More particularly, the received signal level of the receiver 124 is detected by a received signal level detector 125, which in turn is compared with the reference level by the comparator 126, and when, for example, IF signal envelope of the received signal becomes lower than a predetermined threshold value, the antennas 121 and 122 are switched.

To distinguish from said antenna select diversity reception, the receiver shown in FIG. 1 which switches detection outputs will be referred to as "post-detection diversity" hereinafter.

The following problems will occur if the received signal level is used as the data for branch selection in the postdetection diversity system.

The first problem is that the log-amplifiers 105, 106 are required to have a level detection performance over a wide range of signal levels. In practice, however, log-amplifiers could not quite meet such requirements as their level detection characteristics are often saturated in the extremely high or low levels or deviated from linearity in the intermediate range. In the ranges where the characteristics are saturated or deviated, the difference in output voltages decreases although the received signal levels differ between branches, to thereby hamper accurate comparison of received signal levels. As it is difficult to make level detection characteristics of log-amplifiers agree between branches over a wide range of levels, errors occur in the comparison result in the range where disagreement is excessive to thereby decrease the effect of diversity.

The second problem is that when the branch characteristics deteriorate, the diversity effect decreases. In other words, when distortion increases due to the deterioration caused by chronological changes or improper adjustment in the log-amplifier 108 or the detector 109 of either one of the branches in FIG. 1 and the detection characteristics of the branch is deteriorated, the S/N ratio decreases or phase deviation increases inconveniently if received signal levels alone are compared to switch to the detector 109.

The third problem is that the diversity receiver by means of comparison of received signal levels is ineffective when the transmission characteristics deteriorate due to reasons other than the drop of the level of received signals. For example, considering the effect on the interference on the same channel, the effect from the interference waves is generally less when the received signal levels are high and therefore the diversity effect can be achieved. However, as interference waves also change in level due to fading, C/I (desired signal level/interference signal level) becomes smaller if the received signal level is high as shown in FIG. 3(a) than when said level is low as shown in FIG. 3(b), and the probability of errors may increase. In such a case, even if the diversity reception by comparison of received signal levels is used, desired result cannot be achieved.

The fourth problem lies in the fact that when the levels of the signals received in both of the two branches are low, the received level comparator is actuated by thermal noises and precise comparator outputs cannot be obtained. For example, as shown in FIGS. 4(a), 4(b) and 4(c), even if the levels of the desired signals are substantially equal, the levels differ depending on the noise vector when thermal noises are greater. When diversity reception is conducted with the comparator outputs, the transmission characterisitcs may sometimes be deteriorated.

The antenna select diversity reception is not free of problems and the following problems tend to occur when received signal levels are used as the information for branch selection.

Similarly to the third problem in the postdetection diversity reception, the high levels of the received signals do not necessarily mean better transmission quality than the low levels thereof. In other words, even if the level of received signals is high, an error is sometimes caused while no error may occur at a low level. If selection is made based only with the levels of received signals, signals with errors might be selected.

The second problem arises from the fact that IF log-amplifiers are used to detect received signal levels in the antenna select diversity reception. The first problem mentioned in relation to the postdetection diversity reception will occur in the antenna select diversity reception, too.

The third problem arises when a mean of received signal levels is to be obtained as the output from a received signal level detector. For the purpose, a filter is generally inserted at an output of the detector, but delay inevitably occurs in the level comparator output. Because of the delay, when antennas are switched at a high speed, sufficient diversity effect cannot be achieved.

The fourth problem encountered in the case of postdetection diversity reception will also occur in the antenna selection diversity reception if the levels of the input signals are low in both of the branches.

An object of this invention is to overcome those problems encountered in the prior art and to provide a diversity receiver which can achieve diversity effect without the need to detect the received signal levels and which can achieve a remarkable effect not only against fading but also against all the factors which affect transmission circuits.

DISCLOSURE OF THE INVENTION

The diversity receiver according to this invention is characterized in that it selects a branch by referring to relative modulation phase errors.

More particularly, according to the first aspect of this invention, the diversity receiver comprising plural reception branches which respectively receive or detect phase modulated signals from a common transmitter and a selector/combiner means which either selects one of the plural detection data obtained at said plural branches or combines two or more of them with weighting is characterized in that the diversity receiver is further provided with plural relative phase detectors which detect respectively for said plural branches the relative phase of the detected phase of the received signals and the reference phase, and a control means which compares outputs from the plural relative phase detectors and controls said selector/combiner means.

According to the second aspect of this invention, the diversity receiver comprising plural antennas which respectively receive phase modulated signals from a same transmitter and an antenna select means which selects one of said plural antennas and connects the selected one to the receiver is characterized in that the diversity receiver further includes a relative phase detector which detects the relative phase of the detected phase of the signals received by the antenna selected by the selector and the reference phase, and a phase information comparator which compares the relative phase information detected by the phase detector with the reference phase or the data on the relative phase which have been detected in the past and controls said antenna selector means based on the result of the comparison.

In both aspects, the relative phase detector means preferably includes a means which takes out the reference phase signals which are phase locked with the phase modulated signals to be monitored, and a phase shift circuit which generates plural signals that are delayed from the reference phase signal stepwise, and a sampling circuit which samples said phase modulated signals with the plural signals to generate relative phase data.

In the first aspect, phase data are detected from plural phase modulated signals which independently vary in levels and phases due to fading, etc., the detected phase data are compared, a single data is selected out of the plural detected data, or all the detected data are combined with weighting, and the result is outputted. In the second aspect, phase data are detected from received modulated signals, and compared with the reference signal phase or the phase detected in the past, and when the conditions on the line are judged undesirable, the antenna currently in use is switched to another one for connection with the receiver. This is based on the finding that the phase information has a certain relation with the transmission characteristics (for instance, see FIG. 11).

As stated above, this invention receiver does not need detection of received signal levels as it uses the phase information obtained from phase modulated signals as the data for selection/combination for diversity reception. Moreover, according to the first aspect of the invention, as the phase information has a direct relation with the transmission characteristics, this invention receiver is effective not only against fading but also against interference or thermal noises where the transmission characteristics independently deteriorate.

According to the second aspect of this invention, as the selection is made by referring to the phase information taken out of the phase modulated signals, the receiver does not need detection of received signal levels. As the phase information has a close relation with the transmission characteristics, the receiver achieves substantially ideal diversity and can attain remarkable effect not only against fading but also against thermal noises where the transmission characteristics which deteriorate independently.

BRIEF DESCRIPTION OF THE DRAWINGS

FIG. 22 is a block diagram to show the fourth embodiment of this invention.

OPTIMUM MODE TO REALIZE THE INVENTION

Embodiments of this invention will now be described referring to attached drawings.

Figure 5:
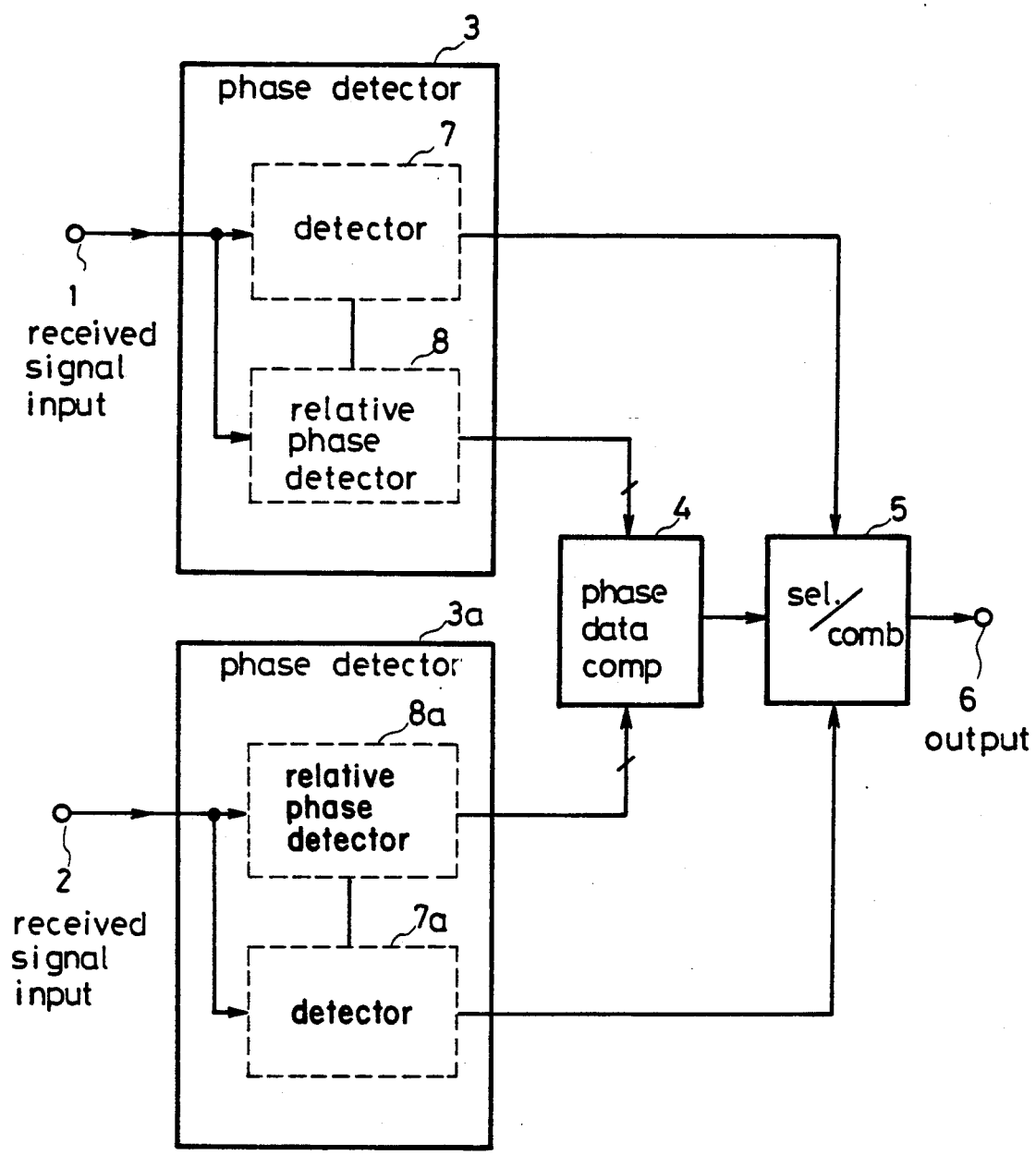
FIG. 5 is a block diagram to show the first embodiment of postdetection diversity receiver according to this invention.

FIG. 5 is a block diagram to show the first embodiment of this invention where the number of diversity branches n is two.

The embodiment includes a first receiver branch comprising a modulated signal input terminal 1 and a detector 7 and a second branch comprising a modulated signal input terminal 2 and a detector 7a as the plural receiver branches which respectively receive and detect phase modulated signals sent from the same transmitter. A selector/combiner circuit 5 alternately selects one of the two detected data obtained through above two receiver branches, or combines both of them with weighting. The two input terminals 1, 2 are inputted with received phase modulated signals from separate receivers, and the output from the selector/combiner 5 is connected to an output terminal 6.

This embodiment is characterized in that each of the plural receiver branches is provided with one each of a relative phase detector 8 or 8a which detects the relative phase of the phase of the received phase modulated signal and the reference phase, and that a phase data comparator 4 is provided as a controller which controls the selector/combiner circuit 5 by comparing the outputs from the two relative phase detectors 8, 8a. The detector 7 and the relative phase detector 8 form a phase detector 3 while the detector 7a and the relative phase detector 8a form a phase detector 3a.

Each of the circuits will now be explained in structure and operation.

Figure 6:
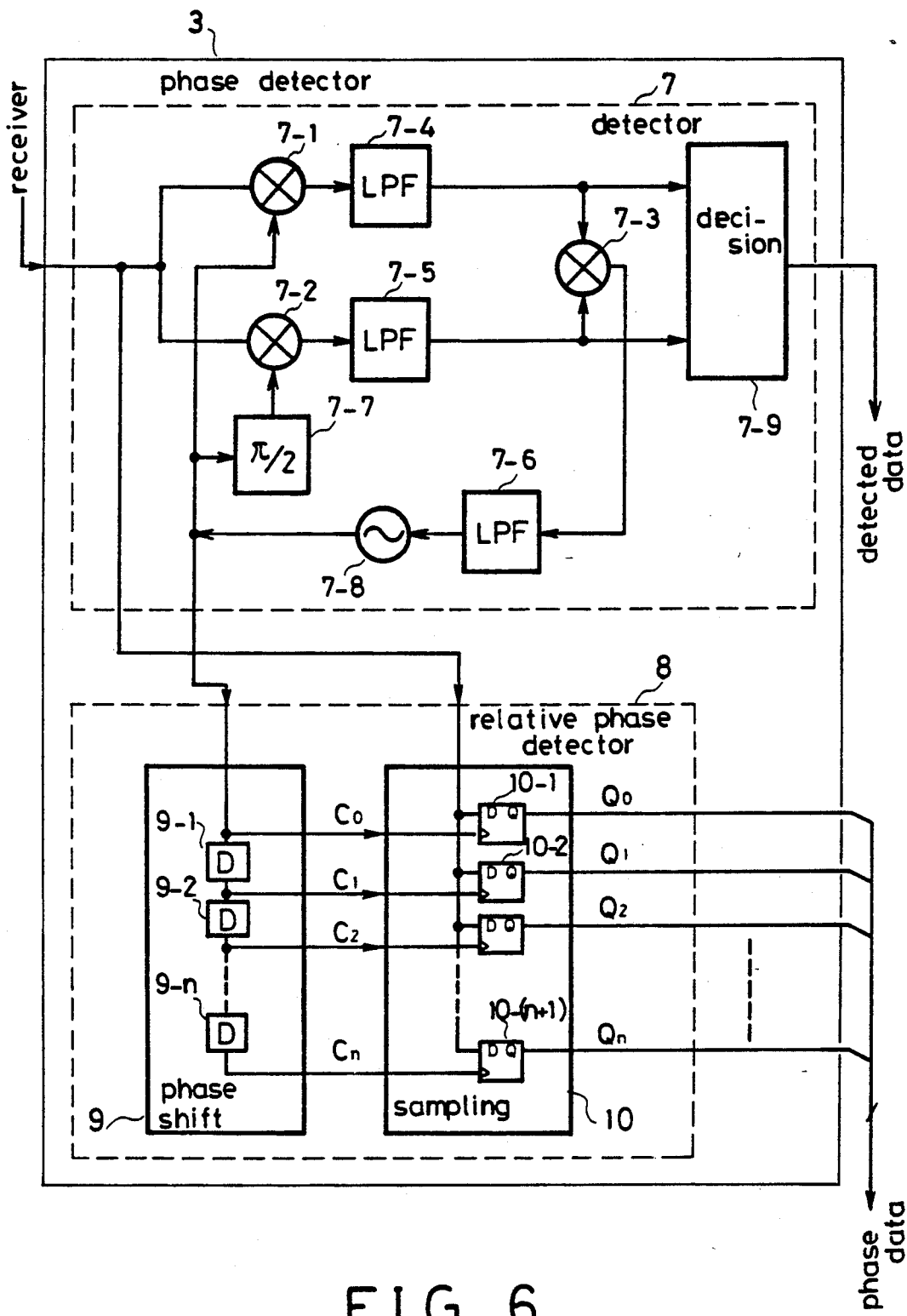
FIG. 6 is a block diagram to show an embodiment of the phase detector.

FIG. 6 is a block diagram to show an embodiment of the phase detectors 3, 3a which will be described using the reference numerals on the side of the detector 3.

The detector 7 is a coherent demodulater where QPSK signals are used as phase modulated signals in the structure which comprises multipliers 7-1, 7-2, 7-3, low-pass filters 7-4, 7-5, 7-6, a $\pi/2$ shift circuit 7-7, a voltage controlled oscillator 7-8, and a decision circuit 7-9, and detects phase modulated signals by recovered carriers.

A relative phase detector 8 includes a phase shift circuit 9 including delay lines (D) 9-1 through 9-n in the number of n, and a sampling circuit 10 including flip-flops 10-1 through 10-(n+1) in the number of (n+1).

The phase shift circuit 9 shifts the phase by using delay lines 9-1 through 9-n in a manner to divide the half period of the reference phase signal by n using the recovered carriers as the reference phase signal and outputs signals $C_0$ through $C_n$. Then, the sampling circuit 10 samples at the flip-flops 10-1 through 10-(n+1) the phase modulated signals with the signals $C_0$ through $C_n$ which have been phase-shifted, and outputs the sampled outputs as the relative phase data $\{Q_0$ through $Q_n\}$. With the data, it becomes possible to decide the position where the phase of phase modulated signals is located relative to the phase of the reference phase signals.

Figure 7A:
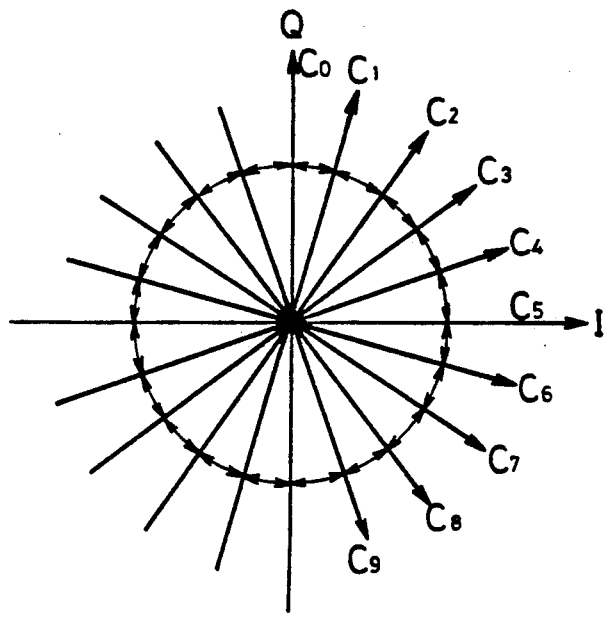
FIGS. 7(a) and 7(b) are explanatory views of operation principle of the relative phase detector.
Figure 7B:
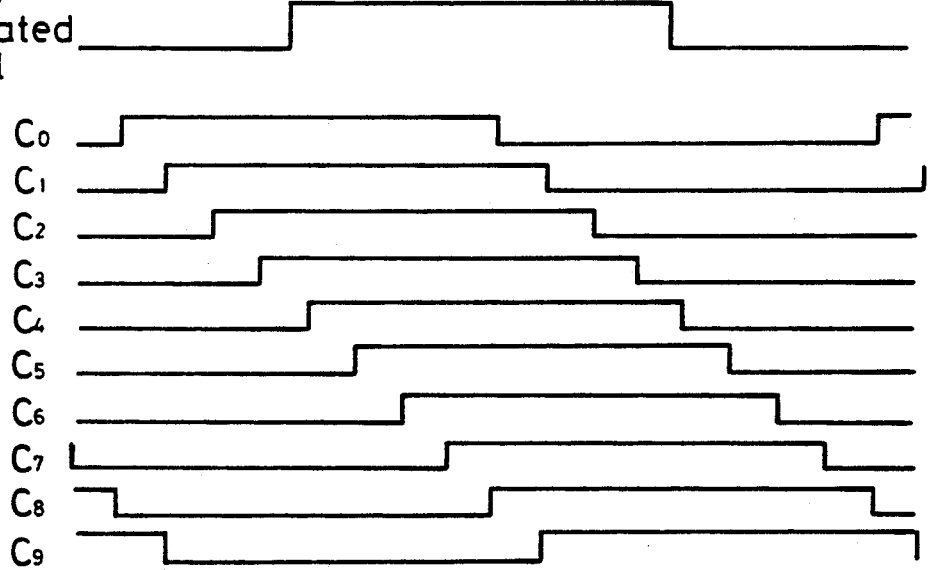

FIGS. 7(a) and 7(b) are the views to explain the operation principle of the relative phase detector 3. For instance, when the frequency of the carriers is 455 kHz (one period=2197.8 nsec), if the delay is set at 109.9 nsec at each delay line 9-1 through 9-n, it becomes possible to obtain recovered carriers which are shifted by 18 degrees from the half period of the carriers. As shown in FIG. 7(a), one period of a carrier is divided into 20 phase areas with the signals $C_0$ through $C_n$ which have been shifted in phase. As shown in FIG. 7(b), when the rising edge of the phase modulated signal is positioned at the phase area shown in the figure, if the flip-flops 10-1 through 10-(n+1) are used as the sampling circuit 10, the relative phase data thereof $\{Q_0 \ldots Q_n\}$ is expressed as 0000111111. As the relative phase data $\{Q_0 \ldots Q_n\}$ are all different from each other depending on the position of the phase of phase modulated signals, it becomes possible to obtain the phase relation between the phase modulated signals and the recovered carriers from the relative phase data $\{Q_0 \ldots Q_n\}$.

The phase data comparator 4 compares the relative phase data between the phase detectors 3 and 3a, and the selector/combiner 5 selects either one detection data. For comparison, when the possible area of the phase is known in advance at the time point, a branch with the least deviation from the phase value is selected.

Figure 8:
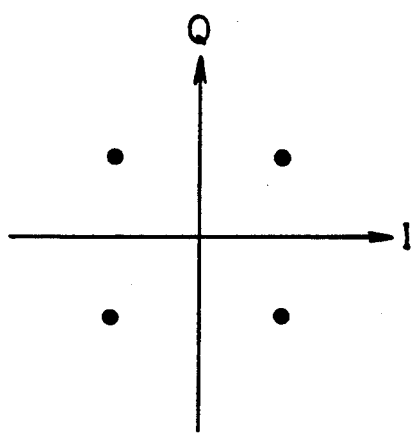
FIG. 8 is an explanatory view to show signal phase on a signal space diagram of QPSK signals.
Figure 9:
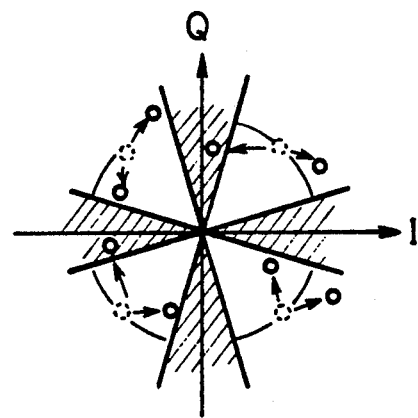
FIG. 9 is an explanatory view to show the phase of QPSK signals when passing through the transmission line where fading exists.

In the case of QPSK signals, for example, the signal phase on the signal space is expressed only with 4 phase points of FIG. 8. It could be expressed with 4 phase points alone even if QPSK signals are limited in band by a roll-off filter when noting them at the optimal decision timing alone. If the carriers corresponding to either I axis or Q axis can be recovered on the side of demodulation, those 4 phase areas become known. When these QPSK signals pass through the transmission line with fading, phases deviate randomly from the 4 phase points as shown in FIG. 9.

Figure 10:
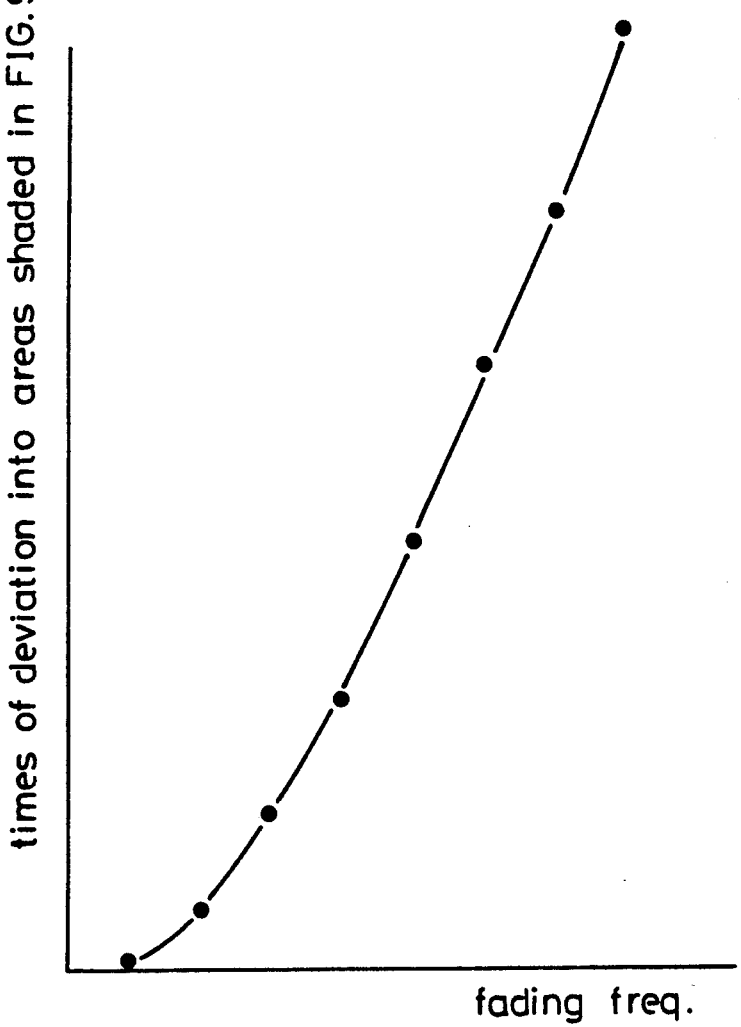
FIG. 10 is a characteristic graph to show the number of the phase deviations as against fading frequency.

Therefore, the larger the deviation is in the phase, the greater is the effect from fading. The graph in FIG. 10 shows the result of measurement of the number of times of deviation into areas shaded in FIG. 9 as against the fading frequency. The higher the fading frequency is, the greater becomes the frequency of the phase variation, and it becomes possible to predict the effect of fading by measuring the degree of phase deviation.

The above is related to the case where the phase deviates by fading. However, the method is applicable not only to the variation by fading but also to variation in phase due to thermal noise, interference, or other factors. So far as the variations are independent from each other in the two branches, the diversity effect can be expected.

The method of branch selection may be one of the following.

(1) Method of selecting a branch by bit-stream

Figure 11:
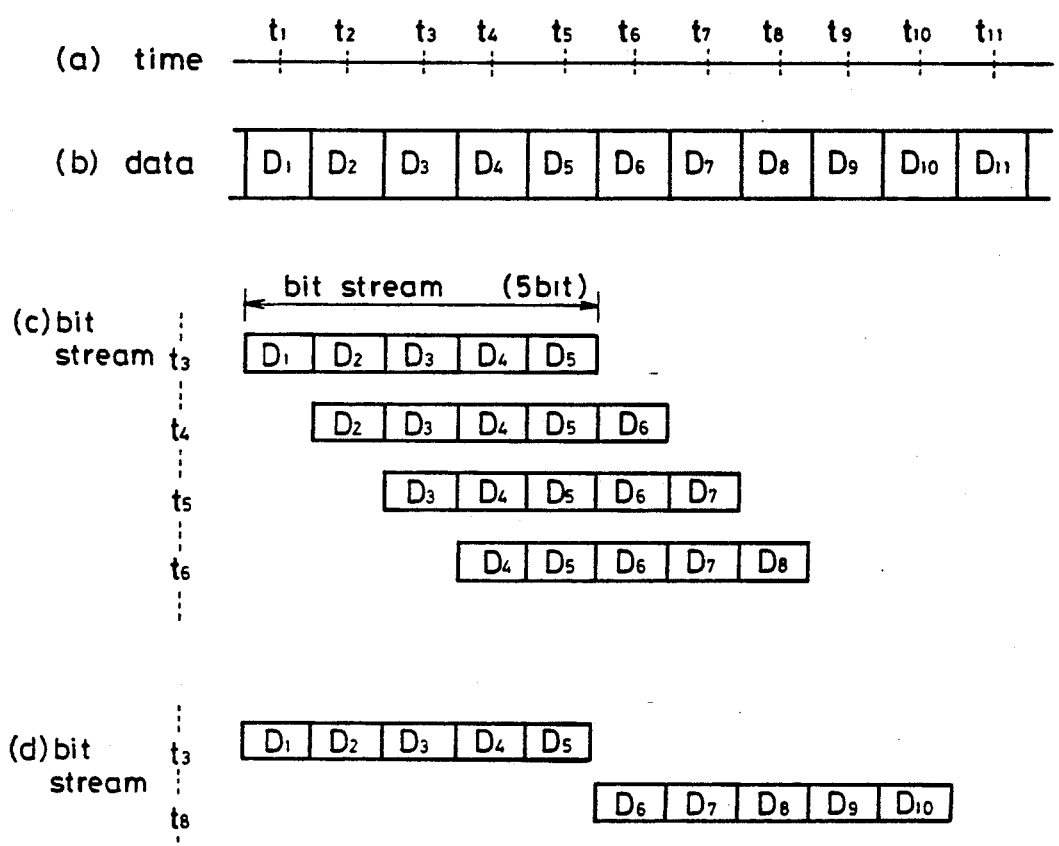
FIGS. 11(a) through 11(d) are explanatory views of a branch selection method.

1) The number of bits moving for a given period of time of continuous bits (bit-stream) into phase areas where bits are not supposed to move is counted, and the branch with a smaller number of counts is judged as the branch which detects signals at a higher quality, and the data from its bit stream is selected. Bit stream may be set by shifting bit by bit as shown in FIG. 11(c) and selecting the data situated at the center of the selected bit stream when times are set as $t_1$ through $t_{11}$, and given the data $D_{11}$ through $D_{11}$ as shown in FIGS. 11(a) and 11(b). It may be set, alternatively, by setting each bit stream separately as shown in FIG. 11(d), and selecting the whole data of the bit stream. Or the logic opposite to the above is conceivable; the number of bits which remain for a certain period of time of continuous bits in the phase area where they should be is counted, and the branch with a larger counts is selected.

2) When phase modulated signals have a certain rule in the phase transfer, phase areas to which the subsequent bit can or cannot transfer can be predicted based on the phase data of continuous bits in a given period. Therefore, the branch with the largest or smallest deviation from the phase area at the subsequent bit is judged as the branch which detects signals at a higher quality. Data is selected from thus selected branch.

(2) Method of instantaneously selecting a branch at each bit

A branch which is situated, in every bit or every two to three bits, in the phase area closer to the phase area where the branch should be is judged as the one which conducts higher quality detection, and the output data with the bit used for the judgement in the particular branch is selected. Each of the phase area may be weighted.

Figure 12B:
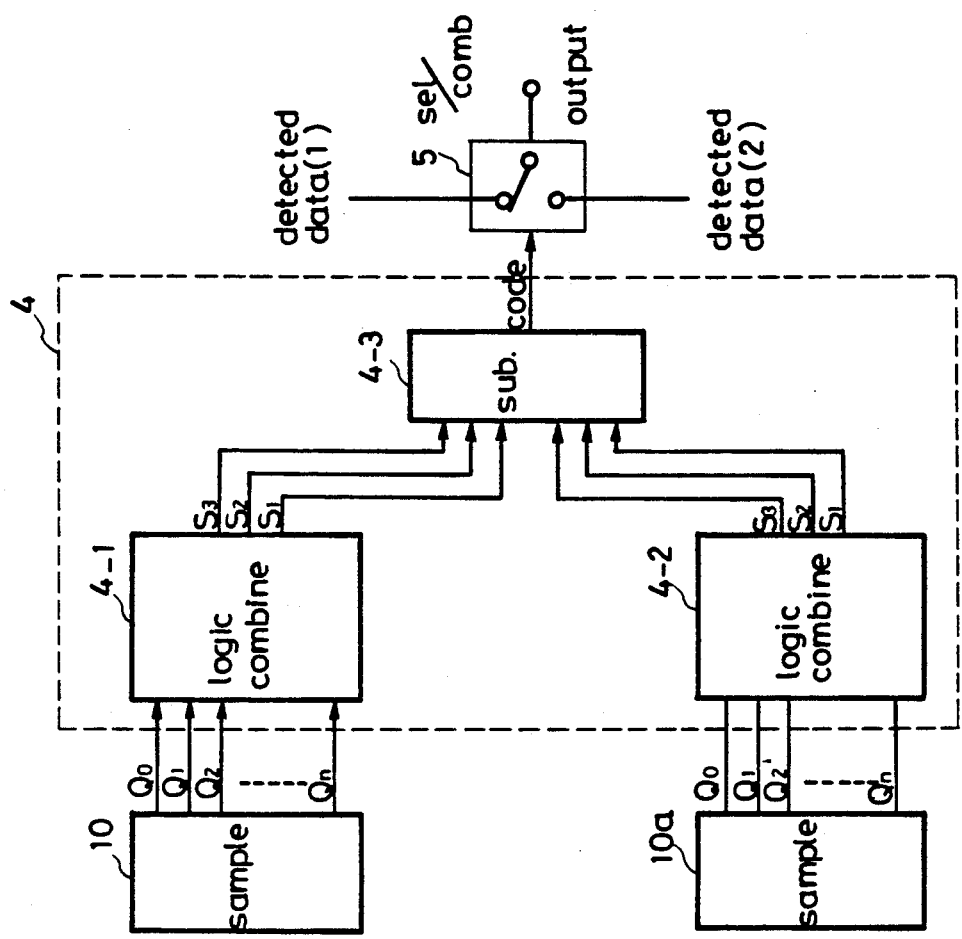
FIG. 12(b) is a block diagram to show an embodiment of the phase data comparator.
Figure 12A:
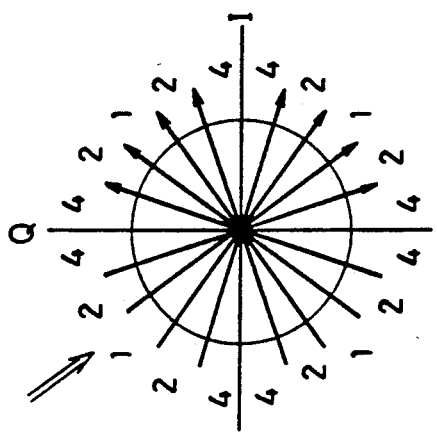
FIG. 12(a) is an explanatory view to show weighting on phase areas.

FIGS. 12(a) and 12(b) show the above-mentioned methods more concretely. As shown in FIG. 12(a), weighting numbers are attached to the phase areas on the signal space, and weighting numbers corresponding to the relative phase data from each phase detector are obtained. The structure may be simply constructed with logic combination circuits 4-1 and 4-2 as shown in FIG. 12(b). Then, the weighting numbers of branches are subtracted by a subtracter 4-3 and compared in magnitude based on the code bit. The branch with the smaller weighting number is judged closer to the phase area in which it is supposed to be situated, and detection data is selected from the branch. When the weighting numbers are equal, either branch may be selected or the previous detection data may be used.

Figure 13:
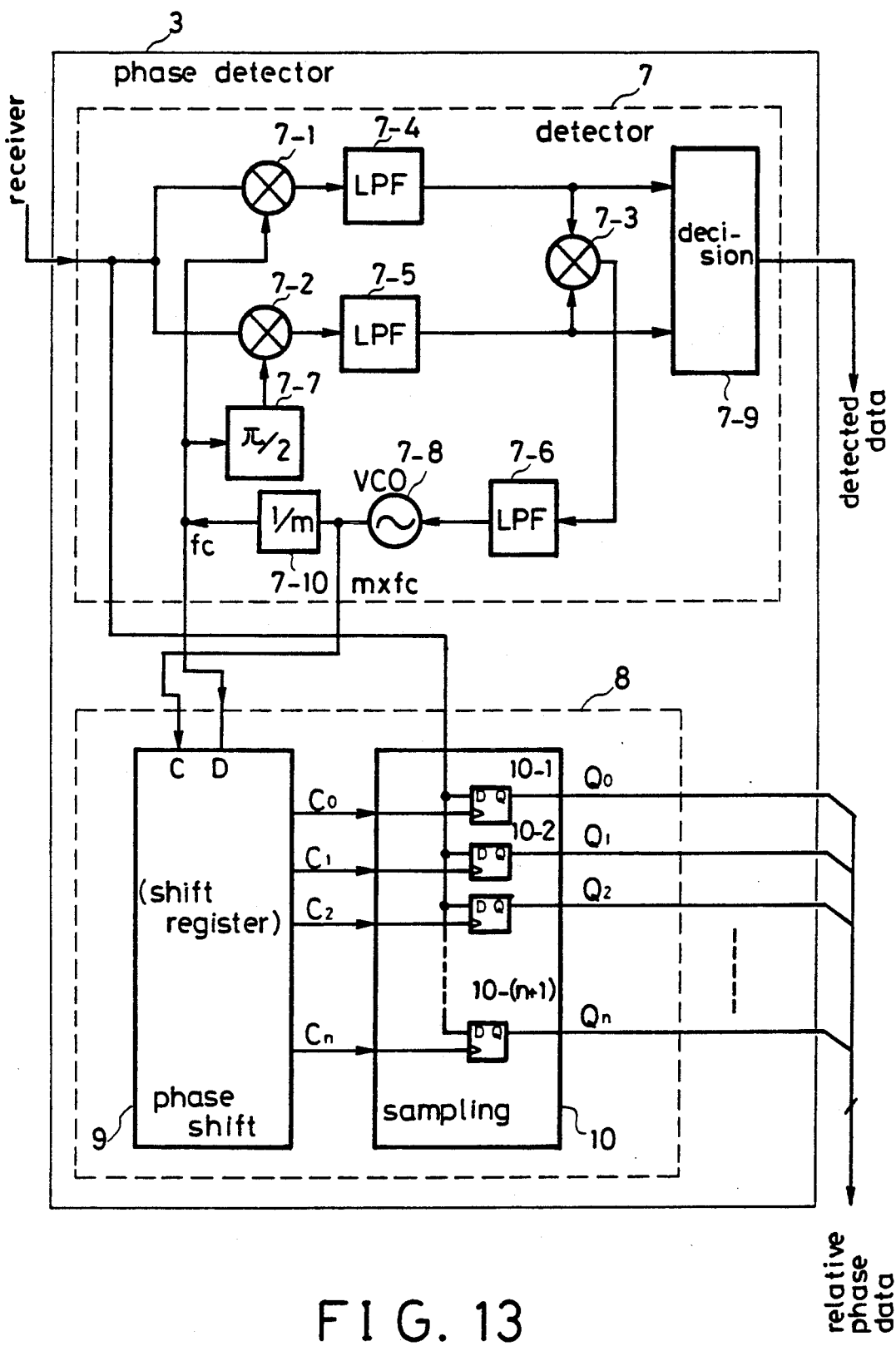
FIG. 13 is a block diagram to show another embodiment of the phase detector wherein a shift register is used as the phase shift circuit.
Figure 14:
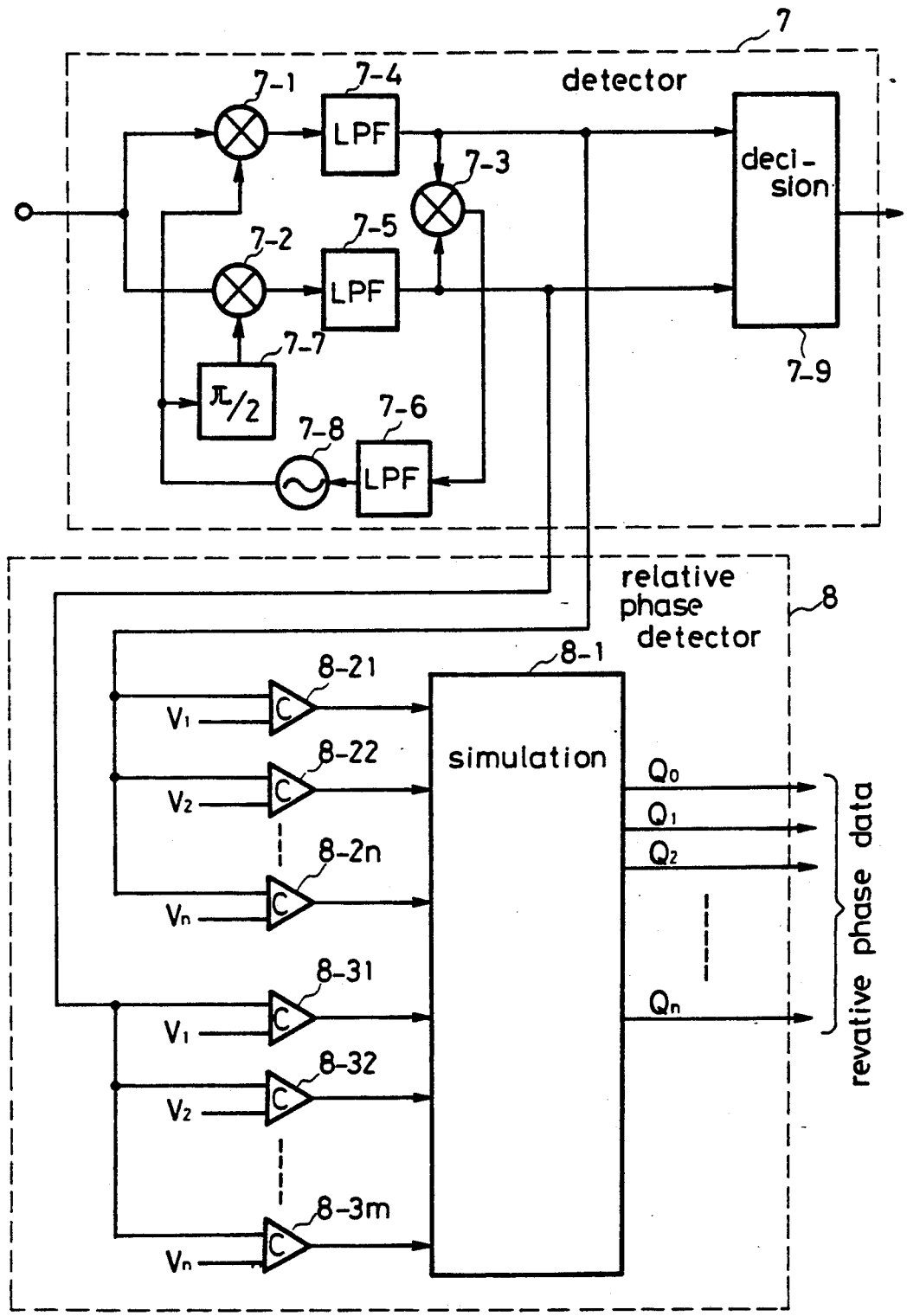
FIG. 14 is a block diagram to show still another embodiment of the phase detector wherein relative phase is detected with detected I and Q signals.
Figure 15:
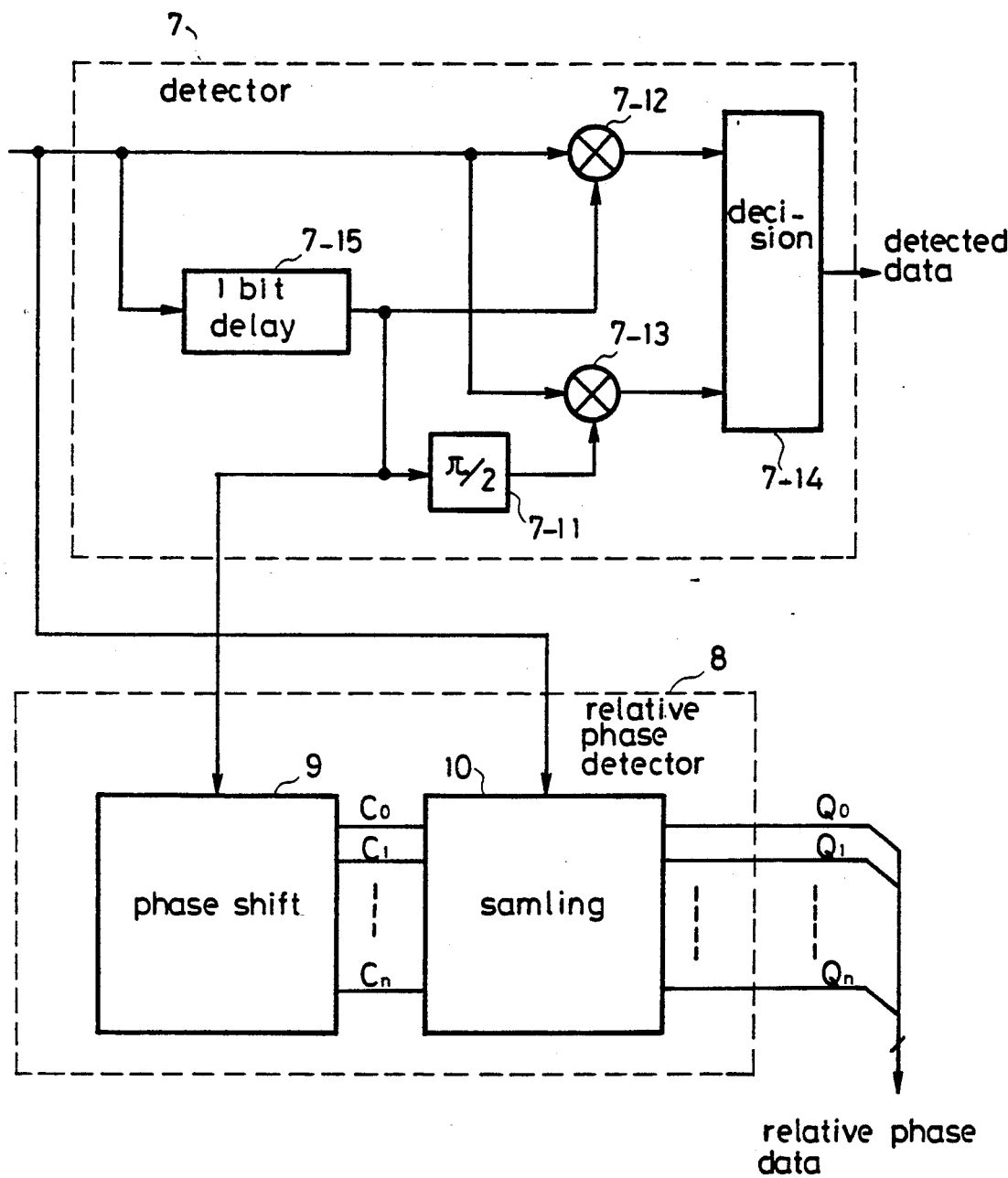
FIG. 15 is still another embodiment of the phase detector wherein a differential demodulator is used as the detector circuit.

FIGS. 13 through 15 show another embodiments of phase detector 3.

The phase detector 3 in FIG. 13 has a phase shifter circuit 9 which is structured with shift registers instead of connecting plural delay lines. When shift registers are used, a voltage controlled oscillator 7-8 within the detector 7 is structured capable of outputting frequency which is m times of the carrier frequency fc, and of obtaining recovered carrier by dividing the same by m with a divider 7-10. By using the output signals from the voltage controlled oscillator 7-8 as clock signals for the shift registers of the phase shift circuit 9, recovered carriers may be shifted for each one period of the output signals from the oscillator 7-8. Alternatively, the sampling circuit 10 may be constructed with an EX-OR circuit and a low-pass filters instead of flip-flops.

The phase detector 3 in FIG. 14 uses I and Q signals which are detected by the detector 7 as the relative phase detector 8. The voltages of the I and Q signals are converted into digital data through multi-stage comparators 8-21 through 8-2n and 8-31 through 8-3n or an A/D converter. From the data the relative phase data can be calculated using a simulation circuit 8-1.

The phase detector 3 shown in FIG. 15 uses a differential demodulator as the detector 7 instead of the coherent demodulator. The differential demodulator includes a $\pi/2$ shift circuit 7-11, multipliers 7-12 and 7-13, a decision circuit 7-14, and a one bit delay circuit 7-15. By multiplying the input phase modulated signals with the signal which has been delayed for one bit of the data signal by the one-bit delay circuit 7-15, detection output for the phase difference component of the data signal may be obtained. In this case, the signal which is delayed for one bit from the phase modulated signal is used as the reference phase signal to be inputted at the phase shift circuit 9.

As described in the above, the first embodiment of this invention does not require detection of received signal levels, so that no log-amplifiers are required, and a simplified circuit which requires no adjustment can be realized. The receiver can conveniently attain diversity effect over a wide range of signal levels as the range is not limited by the log-amplifiers.

Because branches are selected in the first embodiment by phase information which is directly related to detection characteristics, a branch with better characteristics can always be selected at a higher precision. For example, if a receiver is deteriorated, the deteriorated branch might be selected if selection is made simply by the comparison of received signal levels. However, the first embodiment of this invention can constantly achieve better diversity effect irrespective of the levels of received signals.

Figure 1:
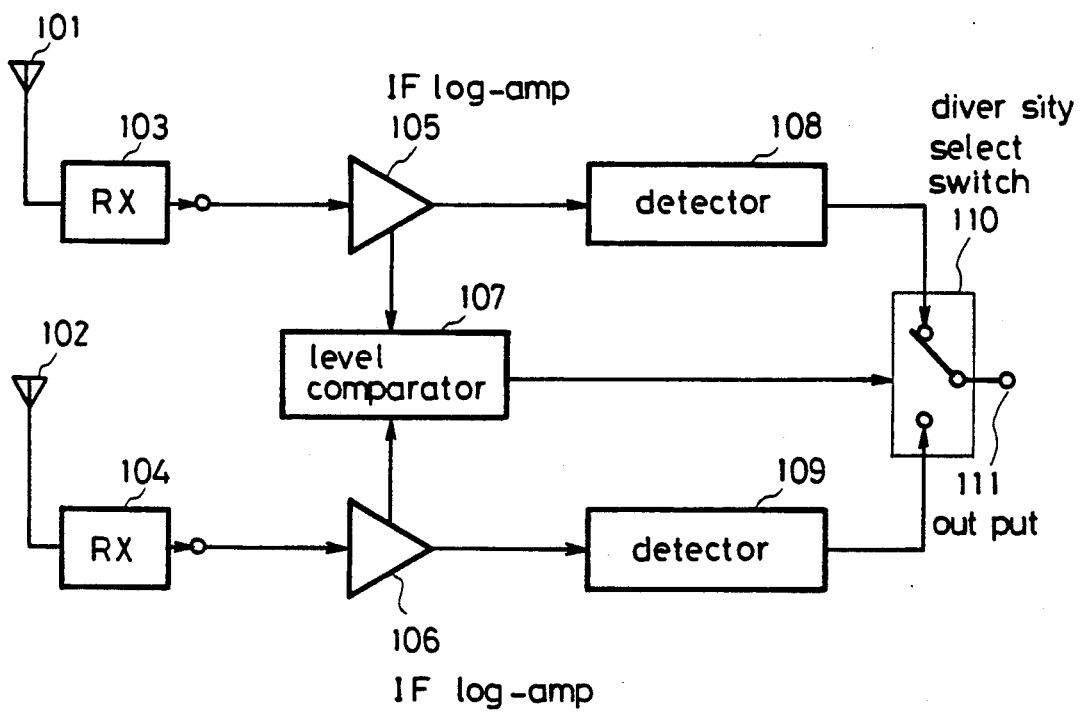
FIG. 1 is a block diagram of a prior art post-detection diversity receiver.
Figure 2:
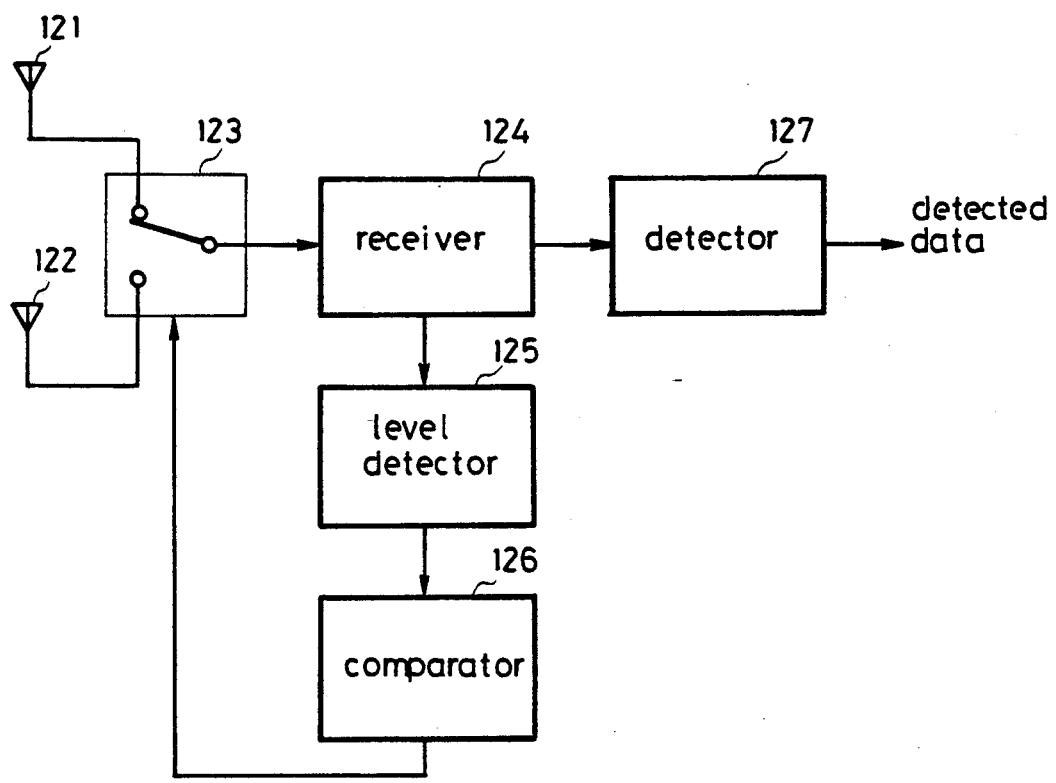
FIG. 2 is a block diagram of a prior art antenna select diversity receiver.
Figure 3A:
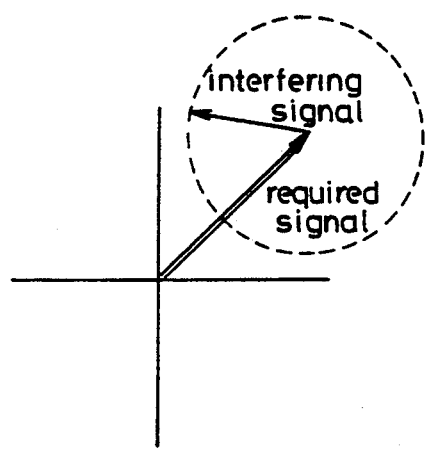
FIGS. 3(a) and 3(b) are explanatory views of signal vectors when interference occurs on the same channel.
Figure 3B:
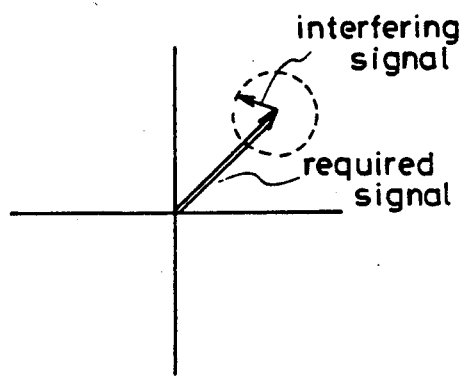

The diversity effect is expected to be achieved not only against fading but also against other factors such as thermal noises or interference which might deteriorate transmission characteristics if the correlation is not significant among plural branches. For example, as described in relation to FIG. 1, when selection is made by comparing the levels of received signals, a branch with a smaller C/I might be chosen, but as this embodiment selects a branch by directly comparing the phases, this invention can securely and constantly select a branch with a larger C/I.

Figures 4A, 4B, 4C:
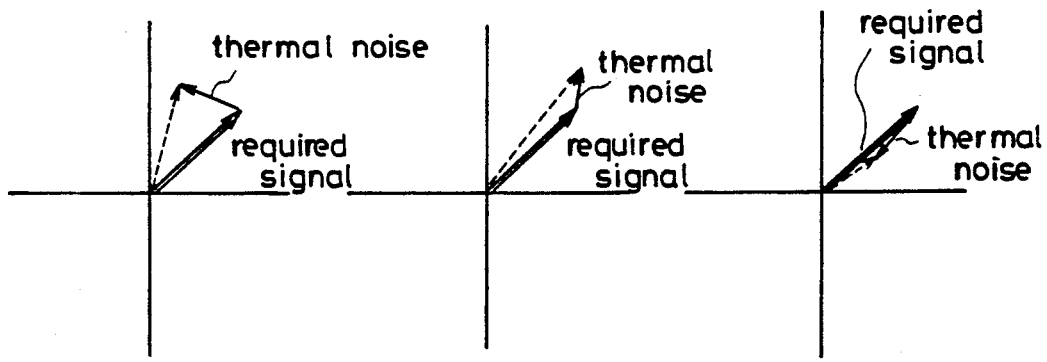
FIGS. 4(a) through 4(c) are explanatory views of signal vectors when the level of received signals is low.

When the two levels of received signals are both low as shown in FIG. 4, comparison of received signal levels tended to result in erroneous selection due to thermal noises. However, the first embodiment of this invention always selects a branch which is less influenced from thermal noises even if thermal noises are large to thereby achieve diversity effect even in the range of low levels where diversity effect could not be expected in the prior art.

Although the foregoing description relates to the case when the selector/combiner circuit 5 acts as a selector circuit, similar structure can be constructed for the case where detection outputs instead of detection data are combined before they are sent to a decision circuit. Outputs may be combined by weighting them in the order of from the larger deviation obtained by the phase data comparator 4 to the smaller one or from the smaller frequency of phase variation to the larger one. The data on weighting can simply be calculated from the output data of sampling circuits 10 by means of a logic combination circuit. The data may be converted into analogue values by a D/A converter. The circuit may be structured with analogue multipliers or digital multi-pliers depending on the modes of data.

Although the number of diversity branches in the first embodiment is 2, this invention can also be applied similarly to cases where the number of branches is 3 or more.

Figure 16:
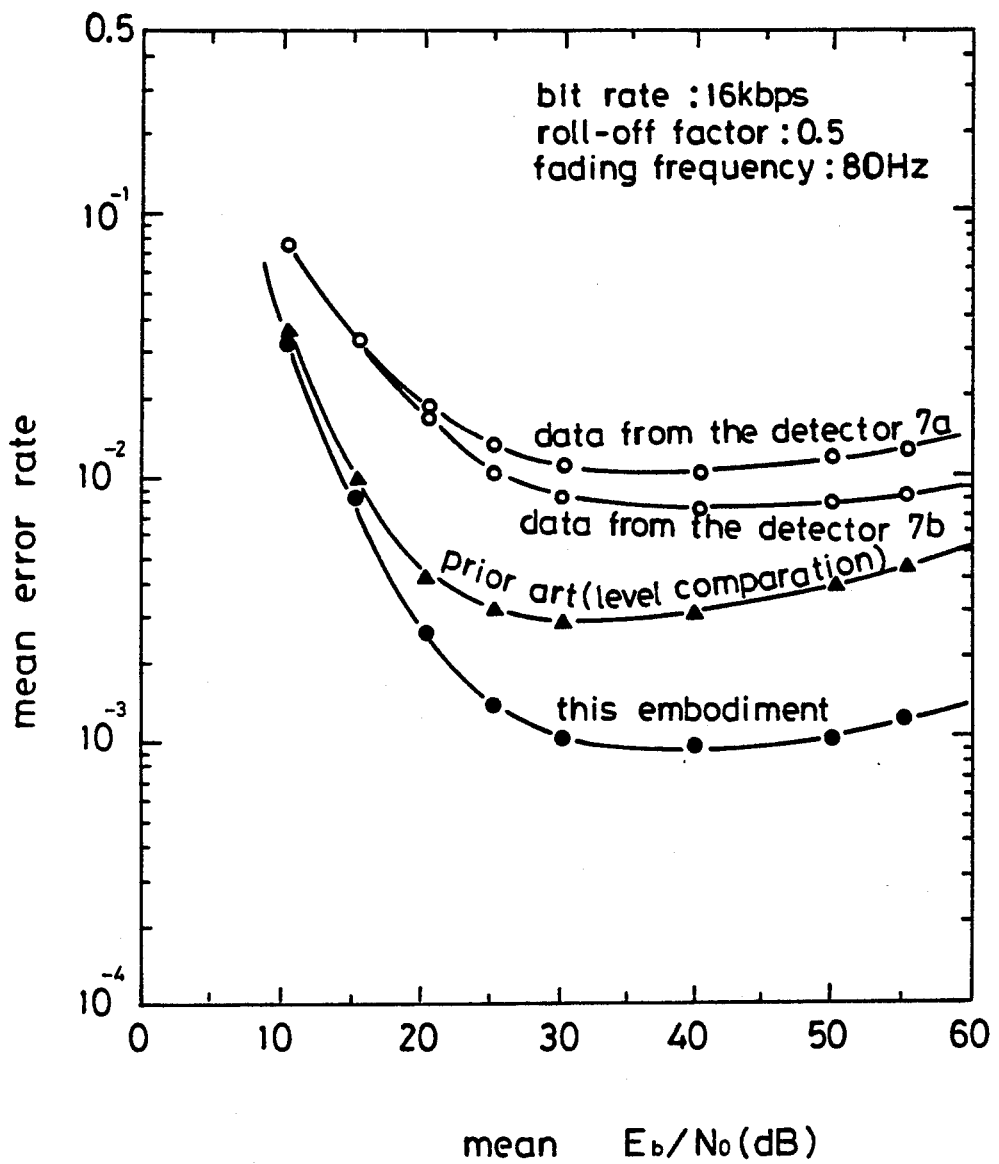
FIG. 16 is a graph to show the error rate characteristics when QPSK modulated signals are detected in synchronization in the mobile radio transmission line under Rayleigh fading.
Figure 17:
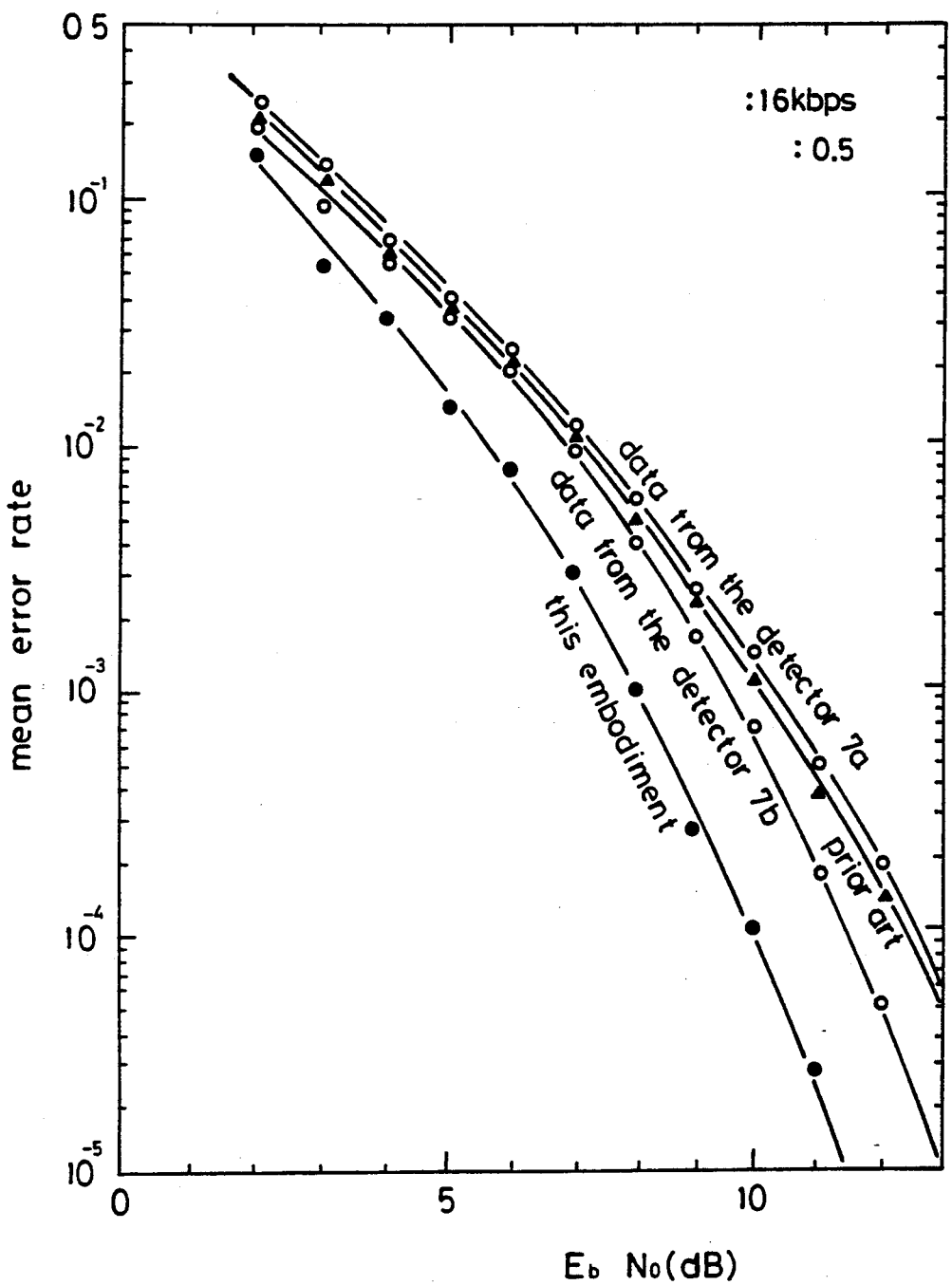
FIG. 17 is a graph to show the error rate characteristics when there is no fading.

FIGS. 16 and 17 show the characteristics when post-detection diversity reception is made by means of phase errors.

FIG. 16 shows an example of error characteristics when QPSK modulated signals are coherently demodulated in the mobile radio transmission under Rayleigh fading. The graph shows characteristics detected by the detectors 7 and 7a without diversity and the characteristics with diversity of the prior art method of comparing the levels, in addition to the curve obtained by this invention. The abscissa axis plots mean value $E_b/N_0$, and higher the level of the received signal, the greater the value. This embodiment achieves diversity effect which is only comparable with that obtained in the prior art method in lower levels. In higher levels (mean $E_b/N_0$), this invention embodiment can reduce errors to about one third of the prior art, or the error rate at approximately $1 \times 10^{-3}$ as compared with $3-4 \times 10^{-3}$ in the prior art.

FIG. 17 shows an example of error rate characteristics without fading.

It is indicated in the graph that the curve of the prior art method of level comparison is similar to the characteristics of the detector 7a with a large error rate while in this embodiment, the required input level can be reduced further by 1.5 dB than the characteristic of the detector 7 having a smaller error rate, and the diversity effect is achieved.

Figure 18:
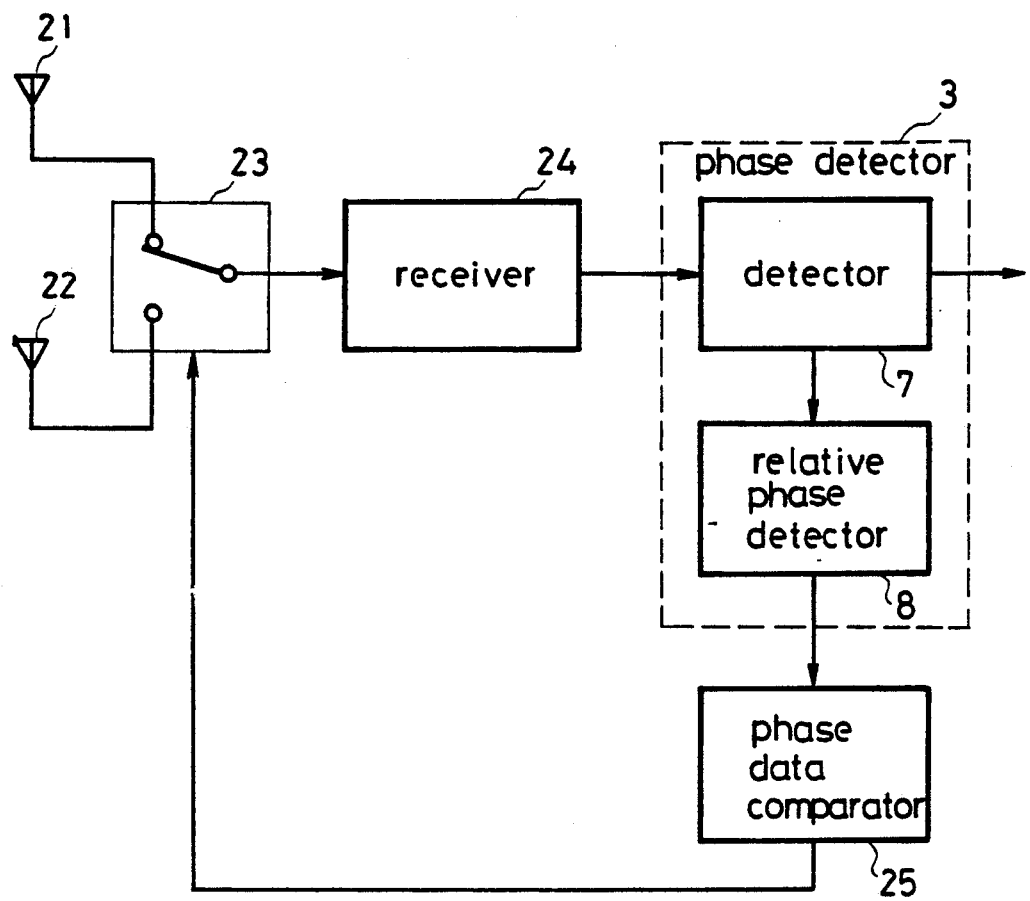
FIG. 18 is a block diagram to show the second embodiment of this invention wherein antenna select diversity receiver is used.

FIG. 18 is a block diagram to show the second embodiment of this invention diversity receiver of antenna select diversity type. In this embodiment, the number n of diversity branches is two.

This embodiment comprises plural antennas 21, 22 which respectively receive phase modulated signals from the same transmitter and an antenna selector 23 which selects one of the plural antennas 21, 22 to connect the same with a receiver 24. The output from the receiver 24 becomes detection data after being detected by a detector 7.

This embodiment is characterized by the structure comprising a relative phase detector 8 which detects the relative phase of the reference phase and the phase of the phase modulated signals received by the antenna which has been selected by the selector 23, and a phase data comparator 25 which compares the data of the relative phase detected by the detector 8 with the reference phase or the relative phase data detected in the past and controls the antenna selector 23 based on the result of the comparison.

The detector 7 and the relative phase detector 8 constitute a phase detector 3 of which structure and operation is similar to the phase detector 3 of the first embodiment.

Figure 19:
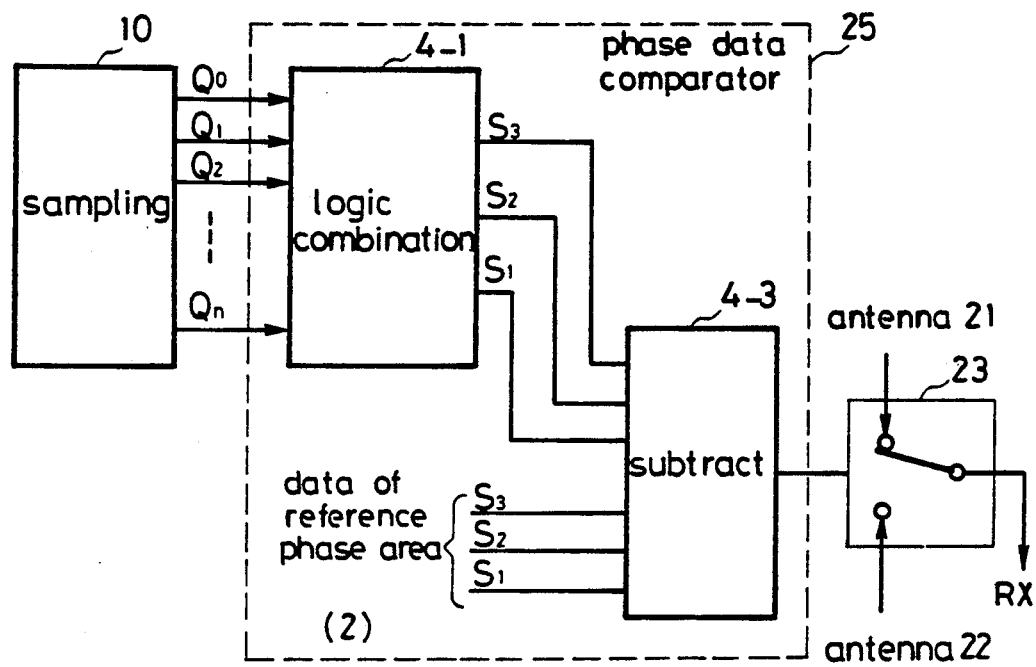
FIG. 19 is a block diagram to show an embodiment of a phase data comparator.

The phase data comparator 25 differs slightly from the phase data comparator of the first embodiment in structure and operation in that it has only one input system. FIG. 19 shows one embodiment of the phase data comparator 25 in block diagram.

In this case, similarly to the case shown in FIG. 12(a), weighting numbers are attached to the phase areas on the signal space diagram and the numbers corresponding to the relative phase data from the detector 3 are obtained. This can easily be constructed with a logic combination circuit 4-1 as shown in FIG. 19. Then, by using a subtracter 4-3, each weighting number of the relative phase data is subtracted from the maximum weighting number (in this case, 2) of the reference phase area to compare the weighting numbers by the code bits. When the weighting number of the data is larger than that of the reference phase area, the antenna is switched (in the case of FIG. 12(a), it is switched if the weighting number is 4).

As described in the above, as this embodiment does not require detection of received signal levels, so that no log-amplifiers are required, and a simplified circuit which requires no adjustment can be realized. As it uses no log-amplifiers, the range of received signal level is no longer limited by them, and diversity effect can be achieved over a wider range.

The embodiment can also achieve diversity effect not only against fading but also against other factors such as thermal noises which might deteriorate transmission characteristics so far as the correlation among plural branches is small.

Figure 20:
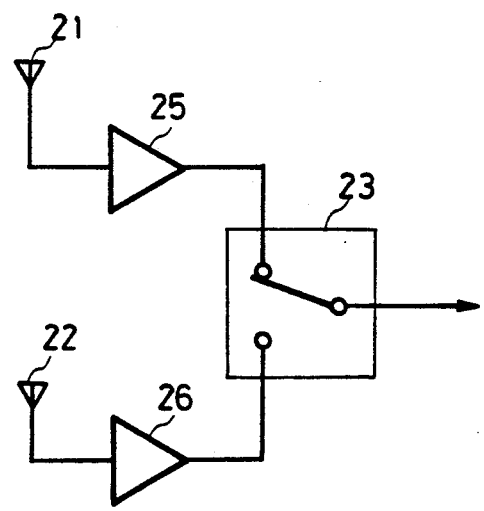
FIG. 20 is a circuit diagram to show a structure wherein correlation of thermal noises between branches is made smaller.

FIG. 20 shows a circuit structure for reducing the correlation of thermal noises among branches. The correlation in thermal noises can be decreased by connecting high gain receiver amplifiers 25, 26 respectively between antennas 21 and 22 and the selector 23.

Whereas errors occurred in the prior art due to thermal noise if the levels of received signals are compared when the two levels are both low, in this embodiment, even if thermal noise is large, the branch with less influence from the vector of thermal noises is constantly selected to attain diversity effect even in the low level range where no diversity effect was achieved by the prior art.

Although phase information alone is used for selection of branches in the above embodiments, branches can be selected by combination of phase information and the levels of received signals. Such embodiment is described below.

Figure 21:
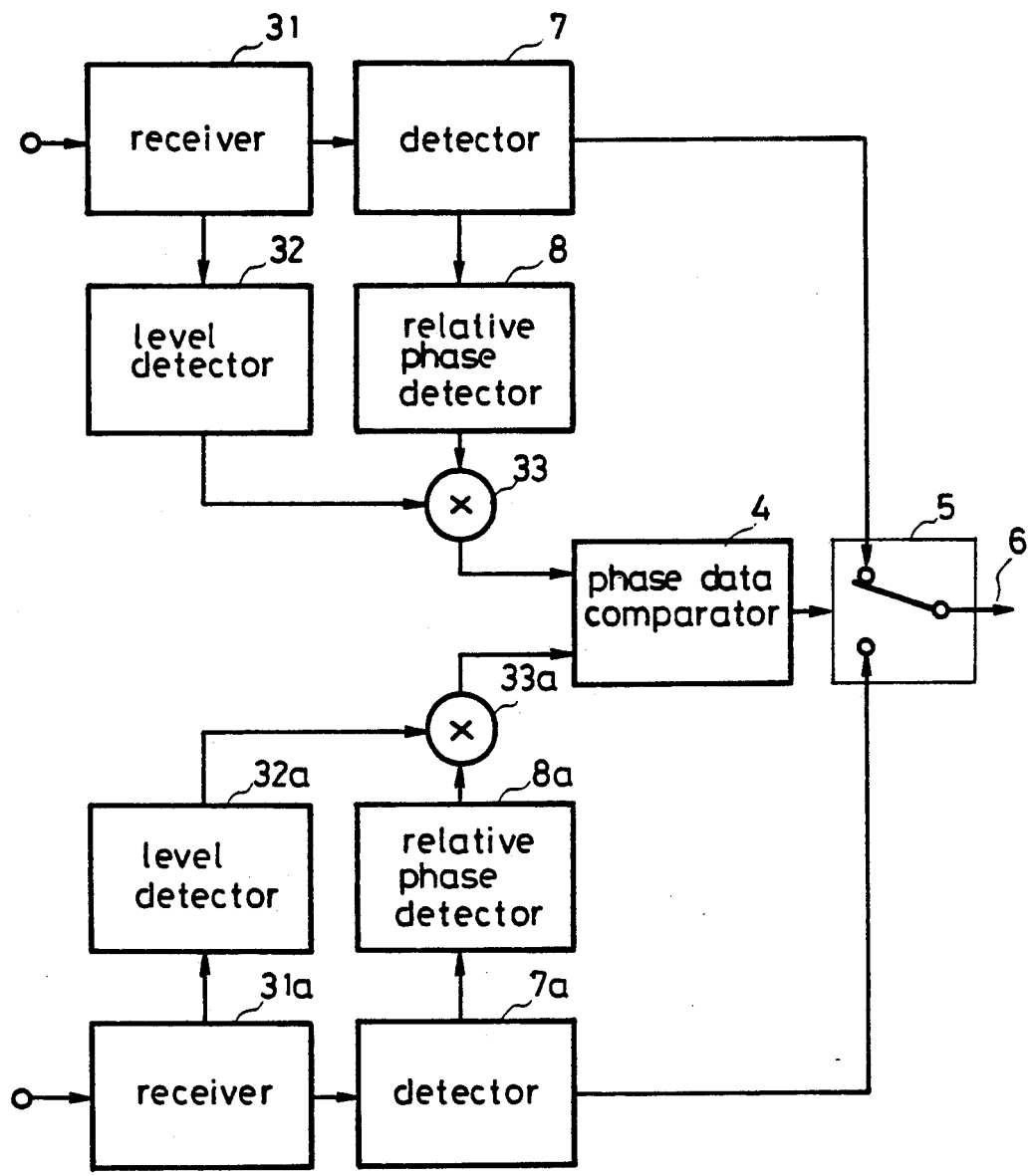
FIG. 21 is a block diagram to show the third embodiment of this invention.

FIG. 21 is a block diagram to show the third embodiment of this invention diversity receiver.

In this embodiment, the outputs from the relative phase detectors 8, 8a of the first embodiment are weighted with the levels of received signals. More particularly, the third embodiment includes in addition to the structure of the first embodiment, level detectors 32, 32a which respectively detect the levels of received signals at the two inputs, and amlifiers 33, 33a which multiply the outputs from the level detectors 32, 32a with the outputs of the relative phase detectors 8, 8a respectively so that the outputs from the receivers 31, 31a are inputted respectively at the detectors 7, 7a as well as are supplied to the level detectors 32, 32a.

In this embodiment, the multipliers 33, 33a weight the relative phase data of the received signals obtained by the detectors 8, 8a with the data of the levels of received signals. This is based on the thinking that the values of the relative phase data are more accurate when the level of the received signals is higher. The relative phase data express the likelihood of the received signals by themselves, but by weighting them, the likelihood is enhanced.

FIG. 22 shows in block diagram the fourth embodiment of this invention diversity receiver.

In addition to the structure of the first embodiment, this embodiment includes received signal level detectors 32, 32a which detect the levels of received signal at the two inputs, a level comparator 41 which compares the levels detected by signal level detectors 32, 32a, and a comparator 42 which compares the output from the phase data comparator 4 with the output from the received signal level comparator 41.

More particularly, instead of multiplying the outputs from the relative phase detectors 8, 8a with the output from the level detectors 32, 32a, and then comparing their likelihood, this embodiment compares the result of the comparison in likelihood (relative phase data) with the result of the comparison in received signal levels. In this fact the fourth embodiment differs from the third embodiment.

In the embodiment, for example, when the relative phase data obtained by the detectors 8, 8a substantially agree with each other (if there are 3 or more receiver branches, a case where there are plural received signals with maximum likelihood expressed by the relative phase data), signals are selected based on the result of comparison of the received signal levels. Conversely, when the level of received signal is used as the comparative informatin and if the levels are identical to each other to make the selection ambiguous, then the result of comparison among relative phase data may be used.

Thus in this embodiment, when selection based either on the likelihood expressed by the relative phase data or on the level comparison becomes ambiguous, it is possible to use one or the other information for comparison. And the error rate can be reduced at the time of such ambiguous selections.

Figure 23:
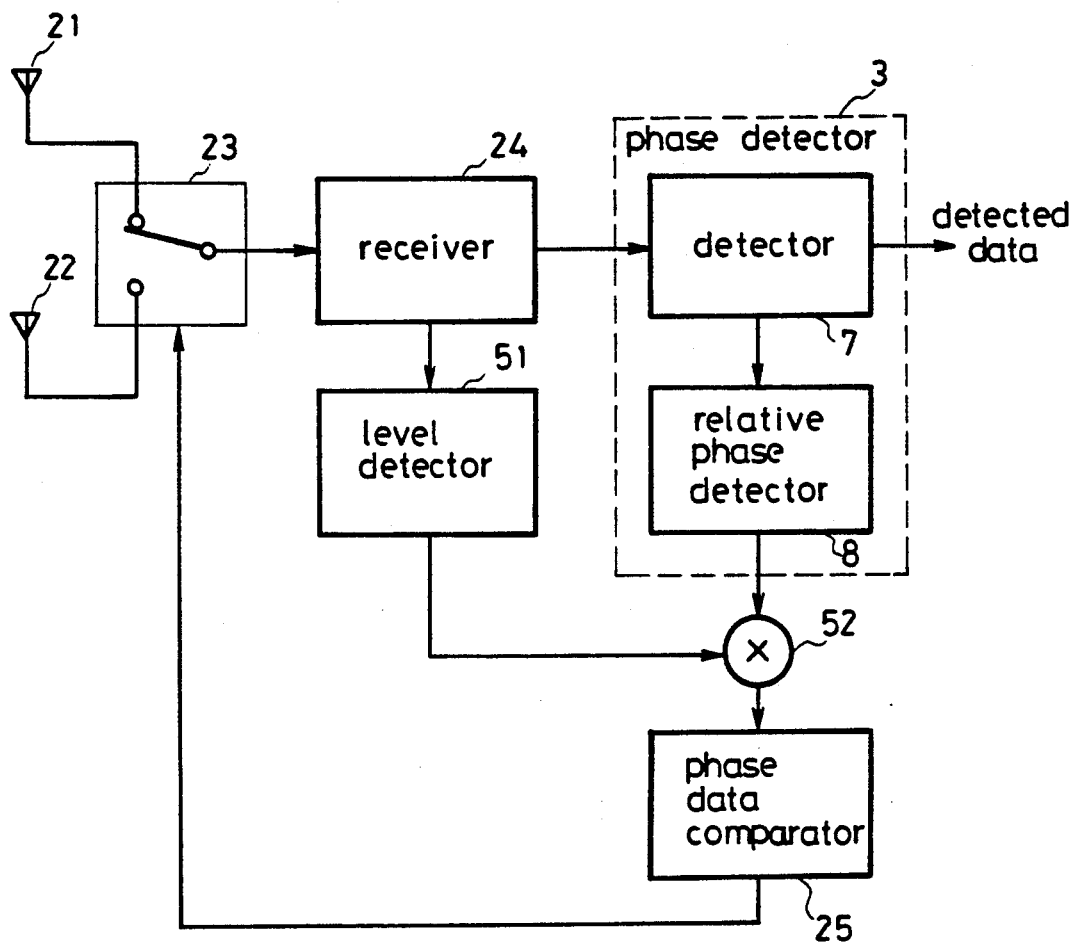
FIG. 23 is a block diagram to show the fifth embodiment of this invention.

FIG. 23 is a block diagram to show the fifth embodiment of the diversity receiver according to this invention.

In addition to the structure of the second embodiment, the fifth embodiment comprises a level detector 51 which detects the level of the signal received by either antenna 21 or 22 selected by the antenna selector 23, and a multiplier 52 which weights relative phase detected from the signals with the level of the received signals and which is provided at the input of the comparator 25. The multiplier 52 weights the phase data outputted from the relative phase detector 8 with the output from the level detector 51. The phase data comparator 25 selects either antenna 21 or 22 referring to the weighted relative phase data.

Figure 24:
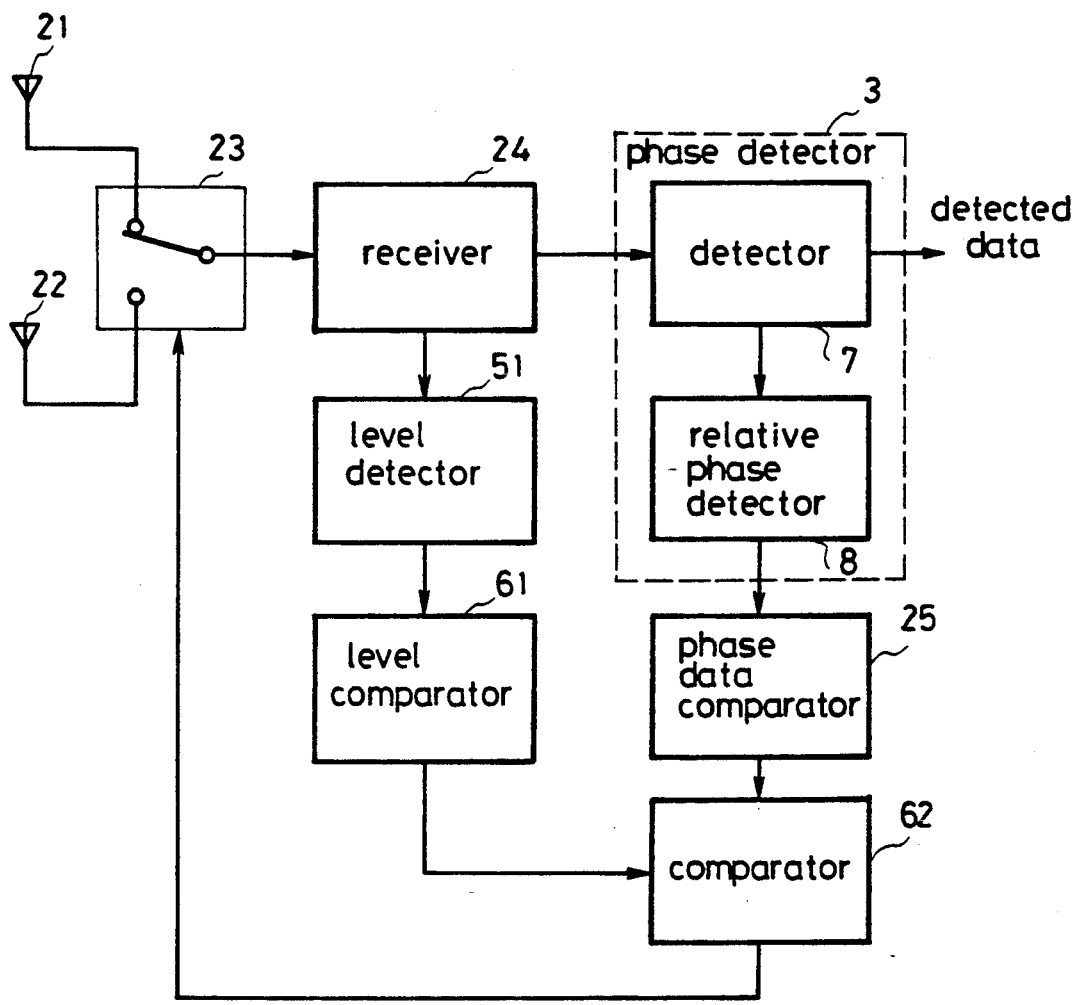
FIG. 24 is a block diagram to show the sixth embodiment of this invention.

FIG. 24 is a block diagram to show the sixth embodiment of the diversity receiver according to this invention.

In addition to the structure of the second embodiment, this embodiment includes a level detector 51 which detects the level of the signal received by the antenna 21 or 22 selected by the antenna selector 23, a level comparator 61 which compares the levels of plural signals received in the past either by antenna 21 or 22, and a comparator 62 which compares the result of comparison of the relative phase outputted form the comparator 25 with the comparator output from the level comparator 61.

This embodiment conducts processing in a manner similar to those of the fourth embodiment shown in FIG. 22 in time series. This allows selection of optimal branch.

INDUSTRIAL APPLICABILITY

As described in the foregoing statement, the receiver according to this invention requires no circuits for detecting/comparing the levels of received signals since it utilizes phase information of phase modulated signals as a means for selecting branches. As a result, adjustment of the detectors for received signal levels or log-amplifiers with a wide dynamic range are unecessary to thereby simplify the structure of the receiver. There is no possibility of weakening the diversity effect due to incomplete adjustment of received signal level detectors. Moreover, as phase detection can be conducted with digital circuits, no adjustment is needed and higher reliability is achieved.

Quality of transmission characteristics can be enhanced as the receiver can achieve diversity effect not only against fading but against interference or thermal noises.

Further, diversity effect is attained if branch is selected by referring to the combination of phase information with received signal levels.

As stated above, this invention can achieve a highly practical effect in the radio communications in general. As this invention can attain diversity effect against thermal noises, sensitivity of the radio receiver can be enhanced, and this is quite significant in satellite communications where even a slight increase in sensitivity is critical.

What is claimed is:

1. A diversity receiver having plural receiver branches which respectively receive and detect phase modulated signals from the same transmitter to obtain plural detection data, and a selector/combiner means which either selects one of the plural detection data obtained by said plural receiver branches or combines them with weighting, the diversity receiver comprising:
    plural detectors which generate a reference signal from the phase modulated signal and phase detect said modulated signal using said reference signal,
    plural relative phase detectors, receiving the phase modulated signal and the reference signal from said detectors and which detect a phase difference between the phase modulated signal and the reference signal, and
    a control means which compares said phase difference from each of said plural relative phase detectors to control said selector/combiner means to select a branch with a minimum phase difference or to combine the branches with weighting based on their phase difference.

2. The diversity receiver as claimed in claim 1 wherein the detectors include a means to take out the reference phase signal which is phase-locked to the phase modulated signals, and said relative phase detectors include a phase shift circuit receiving the reference phase signal and delaying it to generate plural signals that are delayed stepwise from the reference phase signal, and a sampling circuit, connected to said receiver branches and to said phase shift circuit, which samples said phase modulated signals based on said plural signals to generate relative phase data.

3. The diversity receiver as claimed in claim 1 wherein the receiver includes a level detector means connected at respective receiver branches for detecting levels of signals received at said branches, and the control means includes a means to weight the relative phase detected by the relative phase detector in a receiver branch depending on the level of the signal received by the branch.

4. The diversity receiver as claimed in claim 1 which further comprises a received signal level detector means receiving and detecting levels of signals received by respective receiver branches, and a level comparator means which compares the outputs from the level detector means, and wherein the control means includes a means to compare the result of comparison of the relative phase with the comparator output from said level comparator means.

5. A diversity receiver comprising plural antennas which respectively receive phase modulated signals from the same transmitter and an antenna selector means which selects one out of the plural antennas and connects it to the receiver, said receiver comprising:
   a detector which generates a reference signal from the phase modulated signal received by the antenna selected by said antenna selector means and phase detects said modulated signal using said reference signal,
   a relative phase detector means, receiving the reference signal and the phase modulated signal from said detector and which detects a relative phase difference between the phase modulated signal and the reference signal, and
   a phase data comparator which compares the relative phase difference data for a current antenna with phase difference data detected in the past, and controls said antenna selector means based on the result of the comparison to change to another antenna branch when said relative phase difference is larger than one in the past.

6. The diversity receiver as claimed in claim 5 wherein the relative phase detector means includes a means which takes out a reference phase signal which is phase-locked to the phase modulated signals, a phase shift circuit receiving the reference phase signal and delaying it to generate plural signals that are delayed stepwise from the reference phase signal, and a sampling circuit connected to said plural antennas which samples said phase modulated signals based on said plural signals and generates relative phase data.

7. The diversity receiver as claimed in claim 5 which further includes a received signal level detector connected to the antenna selected by the antenna selector means for detecting a signal level received thereby, and wherein the phase data comparator includes a means which weights the relative phase detected from the signal depending on the level of the detected signal.

8. The diversity receiver as claimed in claim 5 which further includes a received signal level detector means receiving and detecting levels of signals received by the antenna selected by the antenna selector, and a level comparator which compares the levels of plural signals received by the antennas selected in the past, and wherein the phase data comparator means includes means to compare the result of the comparison of relative phase with the comparator output from said received signal level comparator.

* * * * *